(12) United States Patent
Bauchot et al.

(10) Patent No.: US 8,201,227 B2
(45) Date of Patent: Jun. 12, 2012

(54) SYSTEM AND METHOD FOR AUTHENTICATING AN END USER

(75) Inventors: Frederic Bauchot, Saint-Jeannet (FR); Flemming Boegelund, Frederikssund (DK); Steven Earl Hicks, Coppell, TX (US); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 12/128,060

(22) Filed: May 28, 2008

(65) Prior Publication Data
US 2009/0282464 A1 Nov. 12, 2009

(30) Foreign Application Priority Data
May 6, 2008 (EP) .................................... 08305152

(51) Int. Cl.
*H04L 29/06* (2006.01)
(52) U.S. Cl. ...................... 726/5; 726/2; 705/67; 345/32
(58) Field of Classification Search .......................... 726/5
See application file for complete search history.

(56) References Cited

U.S. PATENT DOCUMENTS

| | | | |
|---|---|---|---|
| 4,016,404 A | 4/1977 | Appleton | |
| 4,670,644 A | 6/1987 | Grayson | |
| 5,056,142 A | 10/1991 | Lapointe et al. | |
| 5,251,259 A | 10/1993 | Mosley | |
| 5,450,491 A | 9/1995 | McNair | |
| 5,488,664 A | 1/1996 | Shamir | |
| 5,742,035 A | 4/1998 | Kohut | |
| 5,939,699 A | 8/1999 | Perttunen et al. | |
| 7,007,168 B2 | 2/2006 | Kubo et al. | |
| 7,181,433 B2 | 2/2007 | Yousofi | |
| 7,263,205 B2 | 8/2007 | Lev | |
| 7,266,693 B1 | 9/2007 | Potter et al. | |
| 7,659,869 B1 | 2/2010 | Bauchot et al. | |
| 7,672,906 B2 | 3/2010 | Schwartz et al. | |
| 2005/0140497 A1* | 6/2005 | Chiviendacz et al. | 340/5.67 |
| 2005/0144449 A1* | 6/2005 | Voice | 713/169 |
| 2005/0144450 A1 | 6/2005 | Voice | |
| 2005/0149761 A1 | 7/2005 | Chiviendacz et al. | |
| 2006/0015725 A1 | 1/2006 | Voice et al. | |
| 2006/0020559 A1 | 1/2006 | Steinmetz | |
| 2006/0031174 A1 | 2/2006 | Steinmetz | |

(Continued)

OTHER PUBLICATIONS

Zhao et al., Anti-Phishing Mutual Authentication Using Visual Secret Sharing Scheme, Oct. 17-20, 2010, Information Theory and its Applications (ISITA), 2010 International Sumposium, pp. 560-565.*

(Continued)

*Primary Examiner* — Taghi Arani
*Assistant Examiner* — Narciso Victoria
(74) *Attorney, Agent, or Firm* — Schmeiser, Olsen & Watts; John Pivnichny (57) ABSTRACT

A system and associated method for authenticating an end user. The method comprises generating a first mask in response to an authentication request from an end user, the first mask comprising a set of root nodes, a set of server nodes, and a set of client nodes each being unique to the end user. Next, determining the authenticity of the end user based on comparing data received from the end user with nodes contained in the first mask. The data comprising a set of nodes selected by the end user and the end user having selected the data in response to the first mask.

24 Claims, 4 Drawing Sheets

U.S. PATENT DOCUMENTS

| | | | |
|---|---|---|---|
| 2006/0156385 A1 | 7/2006 | Chiviendacz et al. | |
| 2007/0005967 A1* | 1/2007 | Mister et al. | 713/168 |
| 2007/0098965 A1 | 5/2007 | Hoshiyama | |
| 2007/0277224 A1 | 11/2007 | Osborn et al. | |
| 2007/0289000 A1 | 12/2007 | Weiss | |
| 2008/0005035 A1 | 1/2008 | Schwartz et al. | |
| 2008/0148352 A1 | 6/2008 | Matsumoto et al. | |
| 2010/0024004 A1 | 1/2010 | Boegelund et al. | |
| 2010/0138657 A1 | 6/2010 | Bauchot et al. | |
| 2010/0138912 A1 | 6/2010 | Bauchot et al. | |

OTHER PUBLICATIONS

Help in Connecting to Jyske Netbank. [online] 2 pages—original and English Translation. [retrieved on Sep. 11, 2008]. Retrieved from the Internet< URL: https://www.jyskedistance.dk/service/_jb/ASP/Apps/NetbankDemo/demo/jb/html/DK/hlplogon1.htm>.

RSA SecurID. [online] 3 pages. [retrieved on Aug. 21, 2008]. Retrieved from the Internet< URL: http://www.rsa.com/node.aspx?id=1156>.

U.S. Appl. No. 12/316,221, filed Dec. 10, 2008; Confirmation No. 1248; Customer No. 30449.

U.S. Appl. No. 12/316,149, filed Dec. 10, 2008; Confirmation No. 9012; Customer No. 30449.

U.S. Appl. No. 12/329,972, filed Dec. 8, 2008; Confirmation No. 9926; Customer No. 30449.

U.S. Appl. No. 11/967,910, filed Dec. 31, 2007; Customer No. 67647.

Office Action (Mail Date Jan. 28, 2011) for U.S. Appl. No. 11/967,910, filed Dec. 31, 2007; Confirmation No. 7834.

Apr. 20, 2011 Filed Response to Office Action (Mail Date Jan. 28, 2011) for U.S. Appl. No. 11/967,910, filed Dec. 31, 2007; Confirmation No. 7834.

SecurID, Wikipedia, Nov. 27, 2007. [online]. 2 pages. [retrieved on Dec. 1, 2007]. Retrieved from the Internet: < URL: http://en.wikipedia.org/wiki/SecurID >.

Ito et al., "Authentication with 3D Pattern Communication," Electronics and Communications in Japan, Part 1, vol. 87, No. 12, 2004. Obtained from Wiley Periodicals, Inc., pp. 78-89.

QRick Card System, [online] 1 page. [retrieved on May 28, 2008]. Retrieved from the Internet< URL:http://ubiks.net/local/blog/jmt/archives3/004419.html>.

Notice of Allowance (Mail Date Sep. 28, 2009) for U.S. Appl. No. 12/329,972, filed Dec. 8, 2008, First Named Inventor Frederic Bauchot, Confirmation No. 9926.

Office Action (Mail Date: Jun. 14, 2011) for U.S. Appl. No. 11/967,910, filed Dec. 31, 2007; Confirmation No. 7834.

Office Action (Mail Date Oct. 20, 2011) for U.S. Appl. No. 12/316,221, filed Dec. 10, 2008; Confirmation No. 1248.

Office Action (Mail Date Oct. 24, 2011) for U.S. Appl. No. 12/316,149, filed Dec. 10, 2008; Confirmation No. 9012.

Notice of Allowance (Mail Date Feb. 10, 2012) for U.S. Appl. No. 12/316,149, filed Dec. 10, 2008.

* cited by examiner

SYSTEM AND METHOD FOR AUTHENTICATING AN END USER

BACKGROUND OF THE INVENTION

The present invention relates to authenticating an end user; more specifically, authenticating an end user by means of dynamic information to prevent fraud.

Conventional authentication methods utilize static information to validate an end user. Since static information by its very nature rarely changes, individuals can easily capture an end user's authentication information for fraudulent use in the future.

Furthermore, conventional authentication methods traditionally employ only 1-way authentication. The term 1-way authentication hereinafter means identifying only a single party to a multiple party transaction. Conventional authentication methods usually call for an end user to authenticate to an entity (e.g. bank, credit card company, government agency, etc.) without the entity authenticating to the end user. The use of 1-way authentication methods exposes an end user to phishing attacks. The term phishing hereinafter means an attempt to criminally and/or fraudulently acquire sensitive information by masquerading as a trustworthy entity in an electronic medium.

SUMMARY OF THE INVENTION

A method for authenticating an end user, said method comprising generating a first mask in response to an authentication request from an end user, the first mask comprising a set of root nodes, a set of server nodes, and a set of client nodes each being unique to the end user, a first subset of root nodes being transparent and randomly selected from the set of root nodes, a second subset of root nodes being opaque, a first subset of server nodes being transparent and randomly selected from the set of server nodes, a second subset of server nodes being opaque, the set of client nodes being opaque; and determining authenticity of the end user based on comparing data received from the end user with the first subset of root nodes, the data comprising a set of nodes selected by the end user, the end user having selected the data in response to the first mask.

The present invention provides a system and method that overcomes at least one of the current disadvantages of conventional methods.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

One embodiment of the present invention utilizes two displays to facilitate authenticating an end user. The first display being controlled by a server while the end user controls the second display. In one embodiment of the present invention the second display is a liquid crystal display (LCD) contained within a card. The card may be similar to that of a credit card, charge card, debit card, etc.

Furthermore, the first and second displays share some geometrical characteristics. Specifically, the width and height, measured in pixels, are identical for both the first and second display. Alternative embodiments measure the height and width of the first and second displays in units other than pixels; potentially in millimeters, centimeters, inches, etc. The first and second displays are each utilized in an embodiment of the present invention to represent the mask illustrated in FIG. 1.

Figure 1:
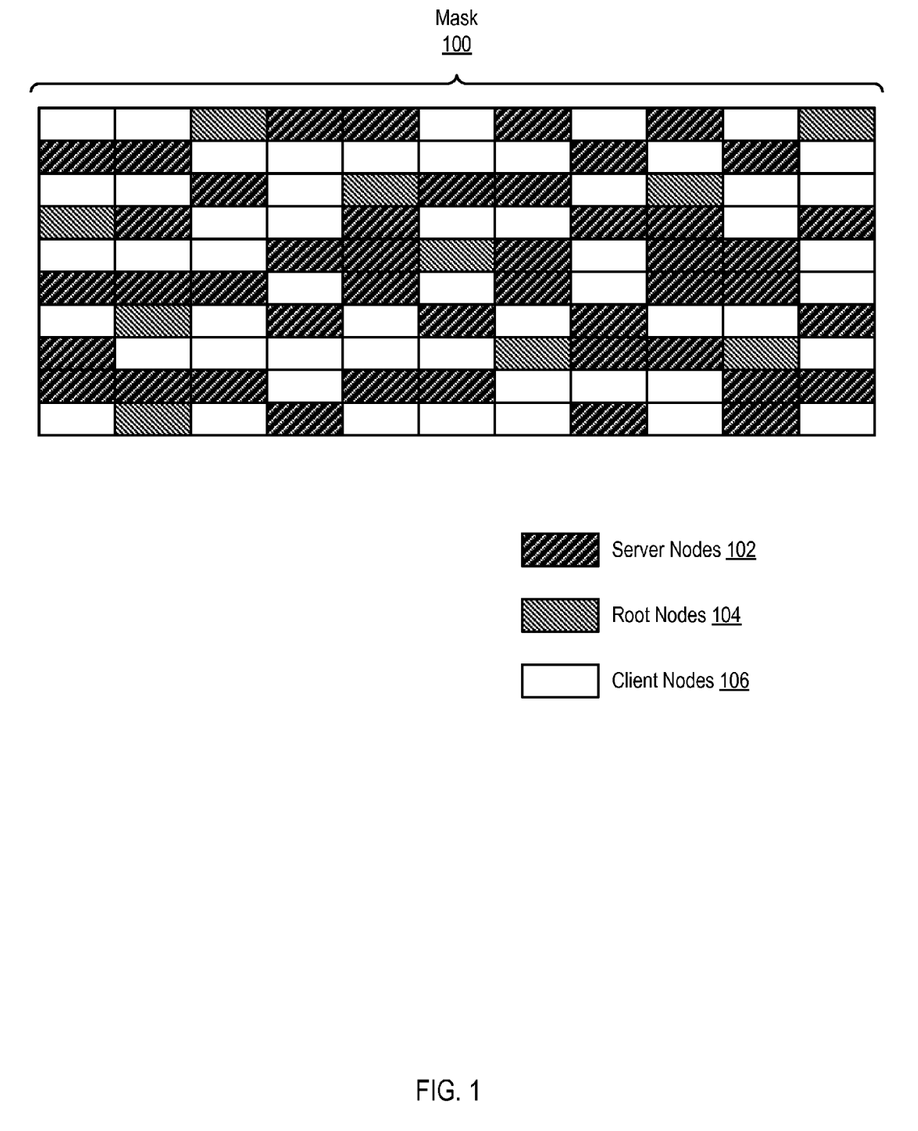
FIG. 1 illustrates a graphical representation of a mask, in accordance with embodiments of the present invention.

FIG. 1 illustrates a graphical representation of a mask 100, in accordance with embodiments of the present invention. The term node and/or nodes as used in this application and accompanying drawings hereinafter means a single point in the mask.

The mask 100 comprises a set of server nodes 102, a set of root nodes 104, and a set of client nodes 106. The sets of server nodes 102, root nodes 104, and client nodes 106 are unique in that their union make up the entire viewable area of the first and/or second display. Furthermore, the intersection of the set of server nodes 102, the set of root nodes 104, and the set of client nodes 106 is disjoint.

In one embodiment of the present invention the number of nodes in the set of server nodes 102 and the number of nodes in the set of client nodes 106 are equivalent, if not the same number. Additionally, the nodes designated to the set of server nodes 102 as well as the set of client nodes 106 are randomly selected and therefore not easily guessed. Likewise, the nodes comprising the root nodes 104 are randomly selected to avoid guessing.

Figure 2:
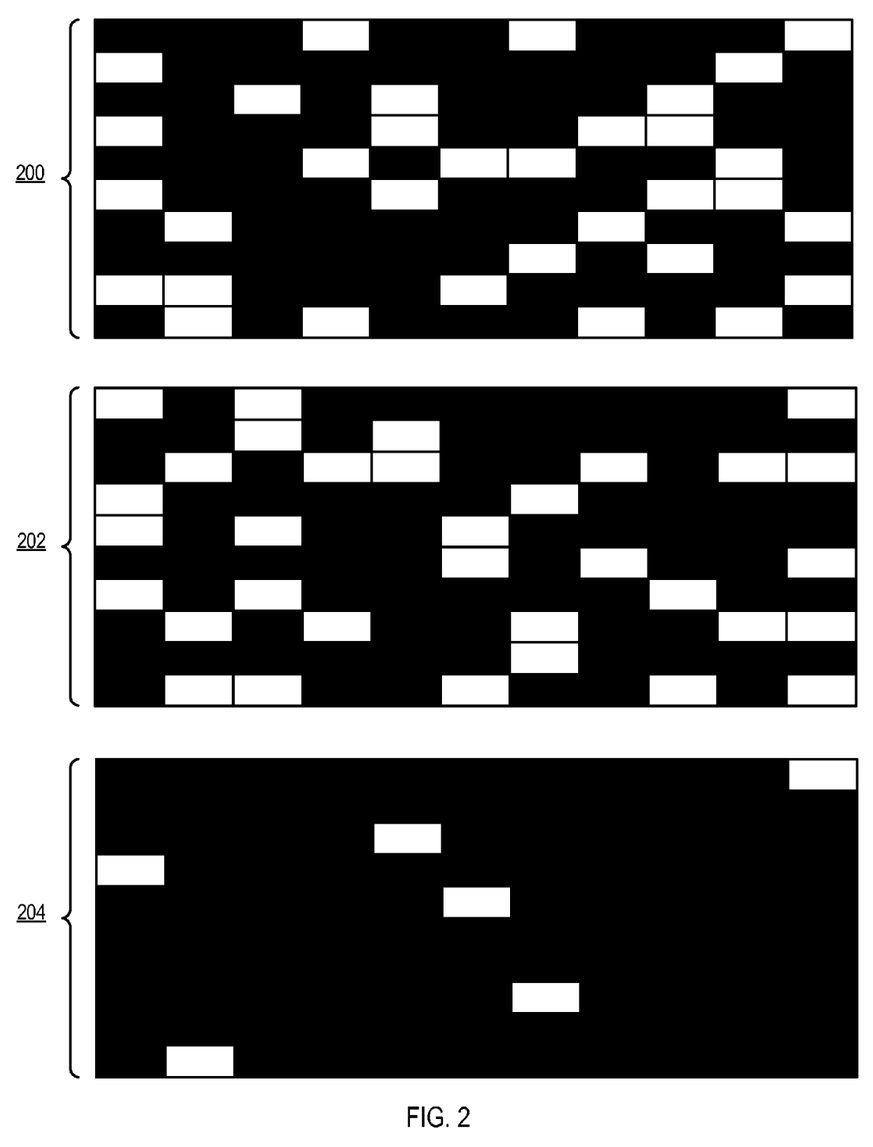
FIG. 2 illustrates a graphical representation of the combination of server mask and client mask, in accordance with embodiments of the present invention.

FIG. 2 illustrates a graphical representation of the combination of server mask 200 and client mask 202, in accordance with embodiments of the present invention.

In one embodiment of the present invention the first display generates the server mask 200 while the second display generates the client mask 202. The server mask 200 and client mask 202 comprise two differently displayed sets of nodes. The set of nodes collectively called the selected nodes are transparent while the set of nodes collectively called the unselected nodes are opaque. The transparent nodes allow for a background pattern to be seen through the nodes, the background pattern being such a bright pattern to maximize contrast between the dark pattern designated for the opaque nodes.

The set of transparent nodes in the server mask 200 comprises a randomly selected subset of the server nodes 102. The set of transparent nodes in the server mask 200 also comprises a randomly selected subset of the root nodes 104. The set of opaque nodes in the server mask 200 comprises the supplement of the server nodes 102 and the supplement of the root nodes 104. Additionally, the set of opaque nodes in the server mask 200 contains the entire set of client nodes 106.

The set of transparent nodes in the client mask 202 comprises a different randomly selected subset of the root nodes 104. The set of transparent nodes in the client mask 202 also comprises a randomly selected subset of the client nodes 106.

The set of opaque nodes in the client mask 202 comprises all of the server nodes 102, the supplement of the root nodes 104, and the supplement of the client nodes 106.

A unique feature of the present invention which solves the problems left unsolved by the conventional method of authentication is in the way the server mask 200 and client mask 202 are used together to authenticate an end user. Since the set of server nodes 102 and the set of client nodes 106 are disjoint, when an end user overlays the client mask 202 onto the server mask 200, all the server nodes 102 and client nodes 106 appear opaque. The resulting overlay 204 displays only a randomly selected subset of the rood nodes 104 which both the server mask 200 and the client mask 202 displayed as transparent.

In order to ensure the server mask 200 and the client mask 202 share root nodes as displayed in 204, a number of root nodes 104 must be randomly selected. If N represents the entire set of root nodes 104, the server mask 200 must select a X number of root nodes 104 wherein $$\frac{1}{2}N < X < N.$$

Additionally, the client mask 202 must select a Y number of root nodes 104 wherein $$\frac{1}{2}N < Y < N.$$

Therefore, in order to authenticate the end user, said end user must select an Z number of nodes from the overlay 204 wherein Z=X+Y−N.

The present invention prevents other individuals or entities from fraudulently authenticate to the server by capturing the contents of the client mask 202. This is due to the fact that the transparent nodes contained in the client mask 202 are randomly selected for each authentication session and thus a previously generated client mask 202 has an infinitesimally small chance of granting authentication in the future.

The present invention also prevents an end user from unsuspectingly providing confidential information to a phishing entity by utilizing two-way authentication. This is due to the fact that the set of server nodes 102 is unique only to an end user are not known to the general public. Therefore, if a phishing site were to attempt a fraudulent authentication session with an end user, there is an infinitesimally small chance the phishing attack would select the correct set of server nodes 102 to display in the server mask 200. An end user noticing an unusually large number of Z nodes in the overlay 204 would instantly recognize that the server mask 200 was fraudulently created and thus not provide confidential information. Therefore, an end user not only authenticates to a server, the server authenticates to the end user to maximize the protection of confidential information.

Figure 3:
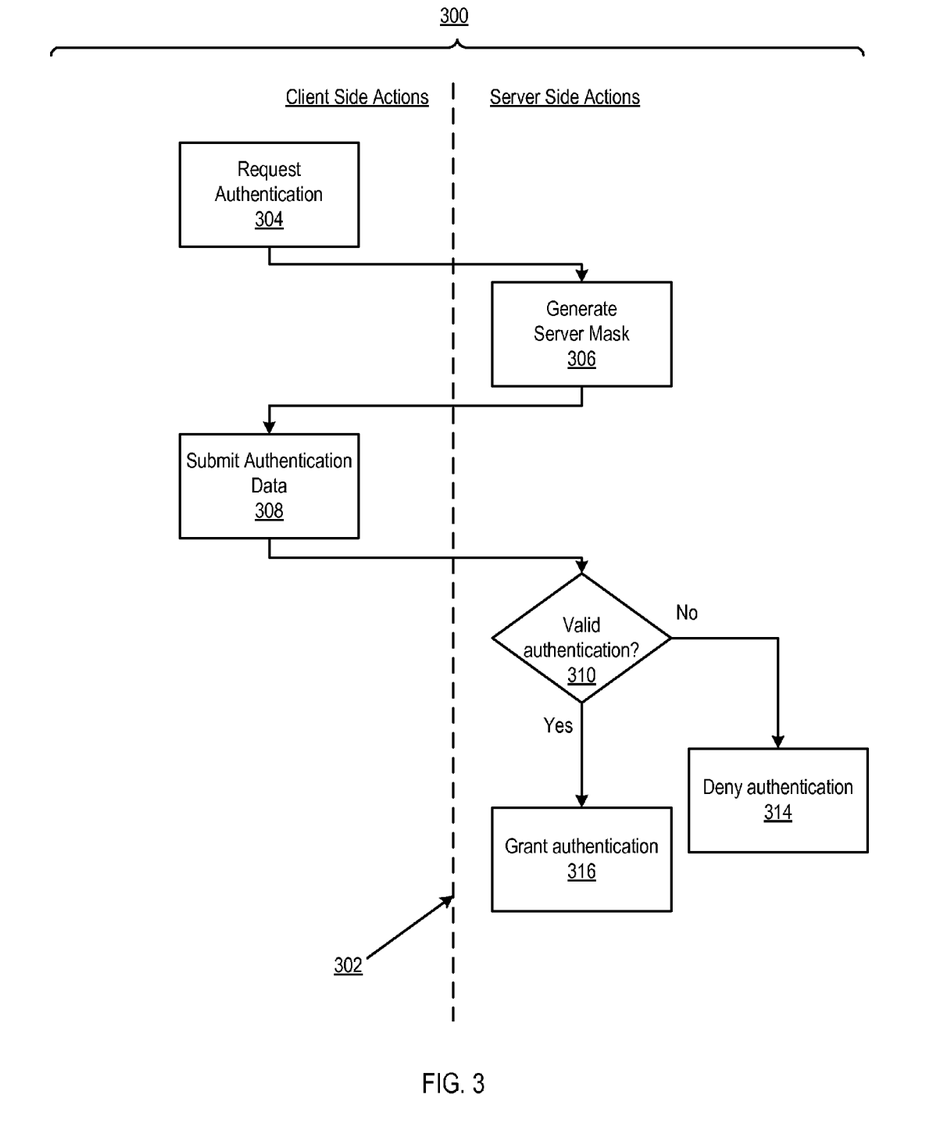
FIG. 3 illustrates a flow chart of operations depicting a method for authenticating an end user, in accordance with embodiments of the present invention.

FIG. 3 illustrates a flow chart of operations depicting a method 300 for authenticating an end user, in accordance with embodiments of the present invention. Note the client side actions and the server side actions are generally indicated by the separation provided by the dashed line 302. The method 300 begins with step 306 which generates the server mask.

Step 306 generates a server mask in response to an end user's request to authenticate 304. In one embodiment of the present invention the request for authentication 304 comprises a user ID and/or password associated with the end user.

The server mask 200 generated by step 306 comprises a randomly selected subset of root nodes 104 which are unique to the end user requesting said authentication. After completion of step 306, the method continues with step 308 wherein the end user submits authentication data.

Step 308 comprises the end user submitting authentication data to the method 300. In one embodiment of the present invention, the end user facilitates the selection of the authentication data D to submit in 308 by utilizing a second display contained in a card sized device which therein creates a client mask 202. The end user overlays the client mask 202 onto the server mask 200, generating the overlay 204 of FIG. 2, supra. In one embodiment of the present invention the end user then selects the transparent nodes contained in the overlay 204 for submission as the authentication data. After completion of step 306, the method 300 continues with step 310 which determines the validity of the authentication data.

Step 310 determines whether the authentication is valid based on the authentication data submitted 308 by the end user. The end user submits authentication data 308, identified as D, which represents transparent nodes contained in the server mask 200. If each node in set D corresponds to a root node 104 randomly selected to appear transparent in the server mask 200, the method 300 grants authentication 316 to the end user. However, if even a single node in set D does not correspond to any of the root nodes 104 randomly selected to appear transparent in the server mask 200, the method 300 denies authentication 314 to the end user.

Figure 4:
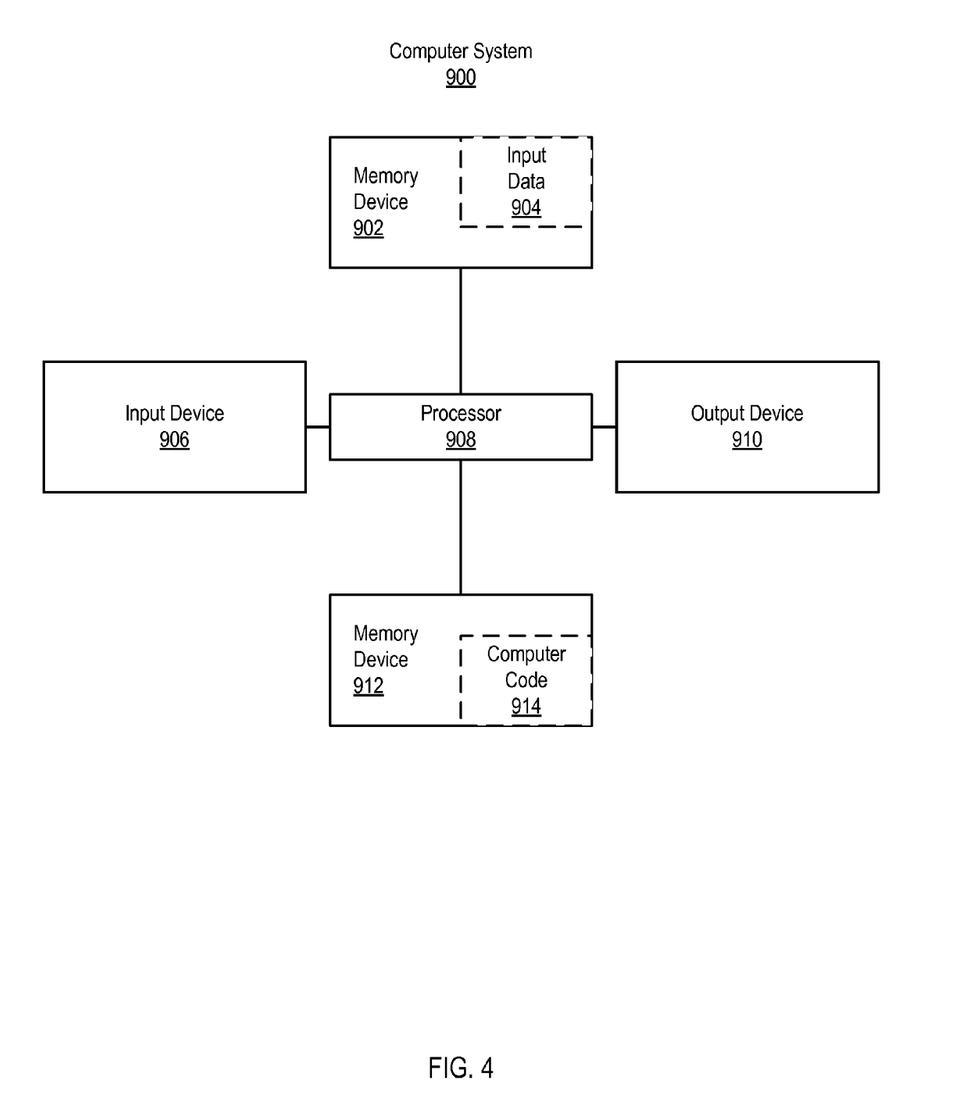
FIG. 4 illustrates a computer system which may facilitate authenticating an end user, in accordance with embodiments of the present invention.

FIG. 4 illustrates a computer system which may facilitate authenticating an end user, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for authenticating an end user according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture)

of the computer system 900 may comprise said computer usable medium (or said program storage device).

Any of the components of the present invention can be deployed, managed, serviced, etc. by a service provider that offers to deploy or integrate computing infrastructure with respect to a process for authenticating an end user. Thus, the present invention discloses a process for supporting computer infrastructure, comprising integrating, hosting, maintaining and deploying computer-readable code into a computing system (e.g., computing system 900), wherein the code in combination with the computing system is capable of performing a method for authenticating an end user.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for authenticating an end user, said method implemented through use of a computer processor, said method comprising:

said processor generating a server mask for display to the end user on a display unit accessible to the end user in response to an authentication request from the end user, wherein the server mask comprises a set of nodes, wherein each node of the set of nodes in the server mask is in a unique spatial location in the server mask, wherein each node of the set of nodes in the server mask is either transparent or opaque, wherein the set of nodes comprises a set of root nodes, wherein the set of root nodes in the server mask consists of a server set of transparent root nodes and a server set of opaque root nodes, and wherein the server set of transparent root nodes are a result of a first random selection of root nodes from the set of root nodes;

after the server mask has been displayed to the end user on the display unit, said processor receiving a selected subset of root nodes of the set of root nodes, said selected subset of root nodes having been selected by the end user; and in response to said receiving the selected subset of root nodes, said processor authenticating the end user by determining that the spatial location in the server mask of each root node of the selected subset of root nodes matches a spatial position of a corresponding root node of the server set of transparent root nodes in the server mask.

2. The method of claim 1, wherein a client mask comprises the set of nodes, wherein each node of the set of nodes in the client mask is in a unique spatial location in the client mask, wherein each node of the set of nodes in the client mask is either transparent or opaque, wherein the set of root nodes in the client mask consists of a client set of transparent root nodes and a client set of opaque root nodes, wherein the client set of transparent root nodes are a second random selection of root nodes from the set of root nodes, wherein the selected subset of root nodes consists of the root nodes of the client set of transparent root nodes that overlap the server set of transparent root nodes while the client mask is overlayed on the displayed server mask, and wherein the client mask had been overlayed on the displayed server mask prior to said receiving the selected subset of root nodes.

3. The method of claim 2, wherein the server set of transparent root nodes comprise transparent root nodes not overlapped by any root node of the client set of transparent root nodes while the client mask is overlayed on the displayed server mask, and wherein the client set of transparent root nodes comprise transparent root nodes not overlapping any root node of the server set of transparent root nodes while the client mask is overlayed on the displayed server mask.

4. The method of claim 3, wherein a total number of nodes of the server set of transparent root nodes is greater than one half of a total number of nodes of the set of root nodes, and wherein a total number of nodes of the client set of transparent root nodes is greater than one half of the total number of nodes of the set of root nodes.

5. The method of claim 2, wherein the set of nodes further comprises a set of server nodes and a set of client nodes, wherein the set of root nodes, the set of server nodes, and the set of client nodes are mutually exclusive in both the server mask and the client mask, wherein the set of server nodes in the server mask comprise a server set of transparent server nodes, wherein the set of client nodes in the client mask comprise a client set of transparent client nodes, and both the server set of transparent server nodes and the client set of transparent client nodes appear opaque to the end user while the client mask is overlayed on the displayed server mask.

6. The method of claim 5, wherein the set of server nodes in the server mask consists of the server set of transparent server nodes and a server set of opaque server nodes, wherein the set of client nodes in the server mask consists of a server set of opaque client nodes, wherein the set of client nodes in the client mask consists of the client set of transparent client nodes and a client set of opaque client nodes, wherein the set of server nodes in the client mask consists of a client set of opaque server nodes.

7. A computer program product, comprising a computer readable physically tangible storage device having a computer readable program code stored therein, said program code configured to be executed by a processor of a computer system to implement a method for authenticating an end user, said method comprising:

said processor generating a server mask for display to the end user on a display unit accessible to the end user in response to an authentication request from the end user, wherein the server mask comprises a set of nodes, wherein each node of the set of nodes in the server mask is in a unique spatial location in the server mask, wherein each node of the set of nodes in the server mask is either transparent or opaque, wherein the set of nodes comprises a set of root nodes, wherein the set of root nodes in the server mask consists of a server set of transparent root nodes and a server set of opaque root nodes, and wherein the server set of transparent root nodes are a result of a first random selection of root nodes from the set of root nodes;

after the server mask has been displayed to the end user on the display unit, said processor receiving a selected subset of root nodes of the set of root nodes, said selected subset of root nodes having been selected by the end user; and in response to said receiving the selected subset of root nodes, said processor authenticating the end user by determining that the spatial location in the server mask of each root node of the selected subset of root nodes matches a spatial position of a corresponding root node of the server set of transparent root nodes in the server mask.

8. The computer program product of claim 7, wherein a client mask comprises the set of nodes, wherein each node of the set of nodes in the client mask is in a unique spatial location in the client mask, wherein each node of the set of nodes in the client mask is either transparent or opaque, wherein the set of root nodes in the client mask consists of a client set of transparent root nodes and a client set of opaque root nodes, wherein the client set of transparent root nodes are a second random selection of root nodes from the set of root nodes, wherein the selected subset of root nodes consists of the root nodes of the client set of transparent root nodes that overlap the server set of transparent root nodes while the client mask is overlayed on the displayed server mask, and wherein the client mask had been overlayed on the displayed server mask prior to said receiving the selected subset of root nodes.

9. The computer program product of claim 8, wherein the server set of transparent root nodes comprise transparent root nodes not overlapped by any root node of the client set of transparent root nodes while the client mask is overlayed on the displayed server mask, and wherein the client set of transparent root nodes comprise transparent root nodes not overlapping any root node of the server set of transparent root nodes while the client mask is overlayed on the displayed server mask.

10. The computer program product of claim 9, wherein a total number of nodes of the server set of transparent root nodes is greater than one half of a total number of nodes of the set of root nodes, and wherein a total number of nodes of the client set of transparent root nodes is greater than one half of the total number of nodes of the set of root nodes.

11. The computer program product of claim 8, wherein the set of nodes further comprises a set of server nodes and a set of client nodes, wherein the set of root nodes, the set of server nodes, and the set of client nodes are mutually exclusive in both the server mask and the client mask, wherein the set of server nodes in the server mask comprise a server set of transparent server nodes, wherein the set of client nodes in the client mask comprise a client set of transparent client nodes, and both the server set of transparent server nodes and the client set of transparent client nodes appear opaque to the end user while the client mask is overlayed on the displayed server mask.

12. The computer program product of claim 11, wherein the set of server nodes in the server mask consists of the server set of transparent server nodes and a server set of opaque server nodes, wherein the set of client nodes in the client mask consists of a server set of opaque client nodes, wherein the set of client nodes in the client mask consists of the client set of transparent client nodes and a client set of opaque client nodes, wherein the set of server nodes in the client mask consists of a client set of opaque server nodes.

13. A computer system comprising a processor and a computer readable memory unit coupled to the processor, said memory unit containing program code configured to be executed by the processor to implement a method for authenticating an end user, said method comprising:

said processor generating a server mask for display to the end user on a display unit accessible to the end user in response to an authentication request from the end user, wherein the server mask comprises a set of nodes, wherein each node of the set of nodes in the server mask is in a unique spatial location in the server mask, wherein each node of the set of nodes in the server mask is either transparent or opaque, wherein the set of nodes comprises a set of root nodes, wherein the set of root nodes in the server mask consists of a server set of transparent root nodes and a server set of opaque root nodes, and wherein the server set of transparent root nodes are a result of a first random selection of root nodes from the set of root nodes;

after the server mask has been displayed to the end user on the display unit, said processor receiving a selected subset of root nodes of the set of root nodes, said selected subset of root nodes having been selected by the end user; and in response to said receiving the selected subset of root nodes, said processor authenticating the end user by determining that the spatial location in the server mask of each root node of the selected subset of root nodes matches a spatial position of a corresponding root node of the server set of transparent root nodes in the server mask.

14. The computer system of claim 13, wherein a client mask comprises the set of nodes, wherein each node of the set of nodes in the client mask is in a unique spatial location in the client mask, wherein each node of the set of nodes in the client mask is either transparent or opaque, wherein the set of root nodes in the client mask consists of a client set of transparent root nodes and a client set of opaque root nodes, wherein the client set of transparent root nodes are a second random selection of root nodes from the set of root nodes, wherein the selected subset of root nodes consists of the root nodes of the client set of transparent root nodes that overlap the server set of transparent root nodes while the client mask is overlayed on the displayed server mask, and wherein the client mask had been overlayed on the displayed server mask prior to said receiving the selected subset of root nodes.

15. The computer system of claim 14, wherein the server set of transparent root nodes comprise transparent root nodes not overlapped by any root node of the client set of transparent root nodes while the client mask is overlayed on the displayed server mask, and wherein the client set of transparent root nodes comprise transparent root nodes not overlapping any root node of the server set of transparent root nodes while the client mask is overlayed on the displayed server mask.

16. The computer system of claim 15, wherein a total number of nodes of the server set of transparent root nodes is greater than one half of a total number of nodes of the set of root nodes, and wherein a total number of nodes of the client set of transparent root nodes is greater than one half of the total number of nodes of the set of root nodes.

17. The computer system of claim 14, wherein the set of nodes further comprises a set of server nodes and a set of client nodes, wherein the set of root nodes, the set of server nodes, and the set of client nodes are mutually exclusive in both the server mask and the client mask, wherein the set of server nodes in the server mask comprise a server set of transparent server nodes, wherein the set of client nodes in the client mask comprise a client set of transparent client nodes, and both the server set of transparent server nodes and the client set of transparent client nodes appear opaque to the end user while the client mask is overlayed on the displayed server mask.

18. The computer system of claim 17, wherein the set of server nodes in the server mask consists of the server set of transparent server nodes and a server set of opaque server nodes, wherein the set of client nodes in the server mask consists of a server set of opaque client nodes, wherein the set of client nodes in the client mask consists of the client set of transparent client nodes and a client set of opaque client nodes, wherein the set of server nodes in the client mask consists of a client set of opaque server nodes.

19. A process for supporting computer infrastructure, said process comprising providing at least one support service for at least one of creating, integrating, hosting, maintaining, and deploying computer-readable code in a computing system, wherein said code in combination with the computing system is capable of implementing a method for authenticating an end user, said method implemented through use of a computer processor, said method comprising:

said processor generating a server mask for display to the end user on a display unit accessible to the end user in response to an authentication request from the end user, wherein the server mask comprises a set of nodes, wherein each node of the set of nodes in the server mask is in a unique spatial location in the server mask, wherein each node of the set of nodes in the server mask is either transparent or opaque, wherein the set of nodes comprises a set of root nodes, wherein the set of root nodes in the server mask consists of a server set of transparent root nodes and a server set of opaque root nodes, and wherein the server set of transparent root nodes are a result of a first random selection of root nodes from the set of root nodes;

after the server mask has been displayed to the end user on the display unit, said processor receiving a selected subset of root nodes of the set of root nodes, said selected subset of root nodes having been selected by the end user; and in response to said receiving the selected subset of root nodes, said processor authenticating the end user by determining that the spatial location in the server mask of each root node of the selected subset of root nodes matches a spatial position of a corresponding root node of the server set of transparent root nodes in the server mask.

20. The process of claim 19, wherein a client mask comprises the set of nodes, wherein each node of the set of nodes in the client mask is in a unique spatial location in the client mask, wherein each node of the set of nodes in the client mask is either transparent or opaque, wherein the set of root nodes in the client mask consists of a client set of transparent root nodes and a client set of opaque root nodes, wherein the client set of transparent root nodes are a second random selection of root nodes from the set of root nodes, wherein the selected subset of root nodes consists of the root nodes of the client set of transparent root nodes that overlap the server set of transparent root nodes while the client mask is overlayed on the displayed server mask, and wherein the client mask had been overlayed on the displayed server mask prior to said receiving the selected subset of root nodes.

21. The process of claim 20, wherein the server set of transparent root nodes comprise transparent root nodes not overlapped by any root node of the client set of transparent root nodes while the client mask is overlayed on the displayed server mask, and wherein the client set of transparent root nodes comprise transparent root nodes not overlapping any root node of the server set of transparent root nodes while the client mask is overlayed on the displayed server mask.

22. The process of claim 21, wherein a total number of nodes of the server set of transparent root nodes is greater than one half of a total number of nodes of the set of root nodes, and wherein a total number of nodes of the client set of transparent root nodes is greater than one half of the total number of nodes of the set of root nodes.

23. The process of claim 20, wherein the set of nodes further comprises a set of server nodes and a set of client nodes, wherein the set of root nodes, the set of server nodes, and the set of client nodes are mutually exclusive in both the server mask and the client mask, wherein the set of server nodes in the server mask comprise a server set of transparent server nodes, wherein the set of client nodes in the client mask comprise a client set of transparent client nodes, and both the server set of transparent server nodes and the client set of transparent client nodes appear opaque to the end user while the client mask is overlayed on the displayed server mask.

24. The process of claim 23, wherein the set of server nodes in the server mask consists of the server set of transparent server nodes and a server set of opaque server nodes, wherein the set of client nodes in the server mask consists of a server set of opaque client nodes, wherein the set of client nodes in the client mask consists of the client set of transparent client nodes and a client set of opaque client nodes, wherein the set of server nodes in the client mask consists of a client set of opaque server nodes.

* * * * *